United States Patent [19]

Jagielinski et al.

[11] Patent Number: 5,386,332
[45] Date of Patent: Jan. 31, 1995

[54] MAGNETIC HEAD FOR HIGH-FREQUENCY, HIGH DENSITY RECORDING

[75] Inventors: Tomasz M. Jagielinski, Carlsbad, Calif.; Charles F. Brucker, Fairport, N.Y.

[73] Assignee: Eastman Kodak Company, Rochester, N.Y.

[21] Appl. No.: 197,655

[22] Filed: Feb. 17, 1994

Related U.S. Application Data

[63] Continuation of Ser. No. 673,995, Mar. 25, 1991, abandoned.

[51] Int. Cl.$^6$ .............................................. G11B 5/147
[52] U.S. Cl. ................................ 360/126; 428/336; 428/432; 428/469; 428/472.2; 428/692; 428/693; 428/900; 148/307
[58] Field of Search ............... 428/692, 693, 694, 900, 428/336, 432, 469, 472.2; 360/119, 120, 126; 148/300, 307, 310, 311; 420/82, 117

[56] References Cited

U.S. PATENT DOCUMENTS

| | | | |
|---|---|---|---|
| 4,671,828 | 6/1987 | Yamauchi et al. | 148/309 |
| 4,683,012 | 7/1987 | Yamauchi et al. | 148/301 |
| 4,748,000 | 5/1988 | Hayashi et al. | 420/82 |
| 4,868,698 | 9/1989 | Takahashi et al. | 360/126 |
| 4,918,555 | 4/1990 | Yoshizawa et al. | 360/125 |
| 4,953,050 | 8/1990 | Kumora et al. | 360/126 |
| 5,018,038 | 5/1991 | Nakanishi | 360/126 |

OTHER PUBLICATIONS

Hayashi, K et al "Soft Magnetic Properties of FeRuGaSi alloy films: Sofmax ®" *J. Appl. Phys.* 64(2) 15 Jul. 1988.

*Primary Examiner*—Stevan A. Resan
*Attorney, Agent, or Firm*—William F. Noval

[57] ABSTRACT

A composite magnetic head has a media-contact surface defined by a gapped magnetic core sandwiched between a pair of ceramic substrates. The core is laminated and comprises thin layers of sputter-deposited FeRuGaSiX uniaxial anisotropic magnetic material alternating with even thinner layers of a dielectric material, where X is selected from the group consisting of Zr, Re, Ni and Co.

5 Claims, 6 Drawing Sheets

MAGNETIC HEAD FOR HIGH-FREQUENCY, HIGH DENSITY RECORDING

This is a continuation of application Ser. No. 07/673,995, filed: Mar. 25, 1991 now abandoned.

BACKGROUND OF THE INVENTION

1. Field Of The Invention

The present invention relates to a magnetic head. More particularly, the invention relates to a magnetic head for large capacity, high transfer rate recording apparatus.

2. Description Of The Related Art

There is an increasing demand for large capacity, high transfer rate recording apparatus, for both image and data storage. Increased capacity requires narrow recording tracks and high linear recording densities. In order to increase linear density, the use of high-coercivity media, like metal particle or metal evaporated, is needed. In turn, higher saturation magnetization is needed in the record head material. High transfer rates demand faster relative head to tape speeds coupled with higher recording frequencies. High recording frequencies put additional demands on the head material.

Monolithic ferrite heads have been used in both magnetic disks and tape drives where they perform well when the coercivity of the recording media is less than 700 oersteds (Oe) and the highest frequency is 10 megahertz (MHz). However, due to the need for improved saturation magnetization and high frequency response, ferrite is not a good choice for newer applications. A so-called metal-in-gap (MIG) head can perform well on high coercivity media but suffers from the same limited frequency response as ferrite heads since ferrite is still the main part of the head core.

Layered metal (composite) and thin film heads, on the other hand, can be built with high saturation magnetization material and can function well at high frequencies. Historically, NiFe thin films have been the magnetic material of choice in a thin film head. However, NiFe has a low resistivity, 20 microohm-cm, and has poor wear resistance. FeSiAl (Sendust) alloys and amorphous materials have higher resistivities and better wear resistance.

Composite heads have been under development for some time and have been especially of interest for use in high definition television (HDTV) recorders. Most of the HDTV heads that have been reported in literature show adequate frequency performance of no greater than about 100 MHz.

SUMMARY OF THE INVENTION

In view of the foregoing, an object of the present invention is to provide a magnetic head having adequate frequency performance to at least 150 MHz and capable of recording on media having a coercivity of at least 1500 Oe. This object is achieved by a magnetic head having a media-contact surface defined by a gapped laminated magnetic core sandwiched between a pair of non-magnetic ceramic substrates. The magnetic core is comprised of thin films of FeRuGaSiX uniaxial anisotropic magnetic material alternating with even thinner films of dielectric material, where X is selected from the group consisting of Zr, Re, Co and Ni.

In a presently preferred embodiment, the multilayered magnetic core is comprised of ten approximately 2-μm films of FeRuGaSiX with composition 65-75 atomic percent (at %) Fe, 8-10 at % Ru, 6-7 at % Ga, 8-15 at % Si, and at % less than 10 of X, alternating with 100 nanometer (nm) films of silicon dioxide ($SiO_2$) or aluminum oxide ($Al_2O_3$).

A magnetic head having a multilayered magnetic core in accordance with the present invention can read and write at 150 MHz on 1500 Oe metal particle tape on a narrow track of less than 40 μm. By adding either Zr, Re, Ni, or Co to an alloy film of FeRuGaSi, permeability of the magnetic material at high frequencies is enhanced. The interlayer dielectric has a high wear-resistant property, prevents electrical coupling between the FeRuGASiX layers, and provides an excellent thermal expansion match with both a MnNi oxide ceramic substrate and the FeRuGaSiX magnetic films.

These advantages, as well as other advantages of the invention, will become more apparent in the detailed description of a preferred embodiment presented below.

BRIEF DESCRIPTION OF THE DRAWINGS

The invention will be described with reference to the accompanying drawings, wherein.

DETAILED DESCRIPTION OF A PREFERRED EMBODIMENT

Figure 1:
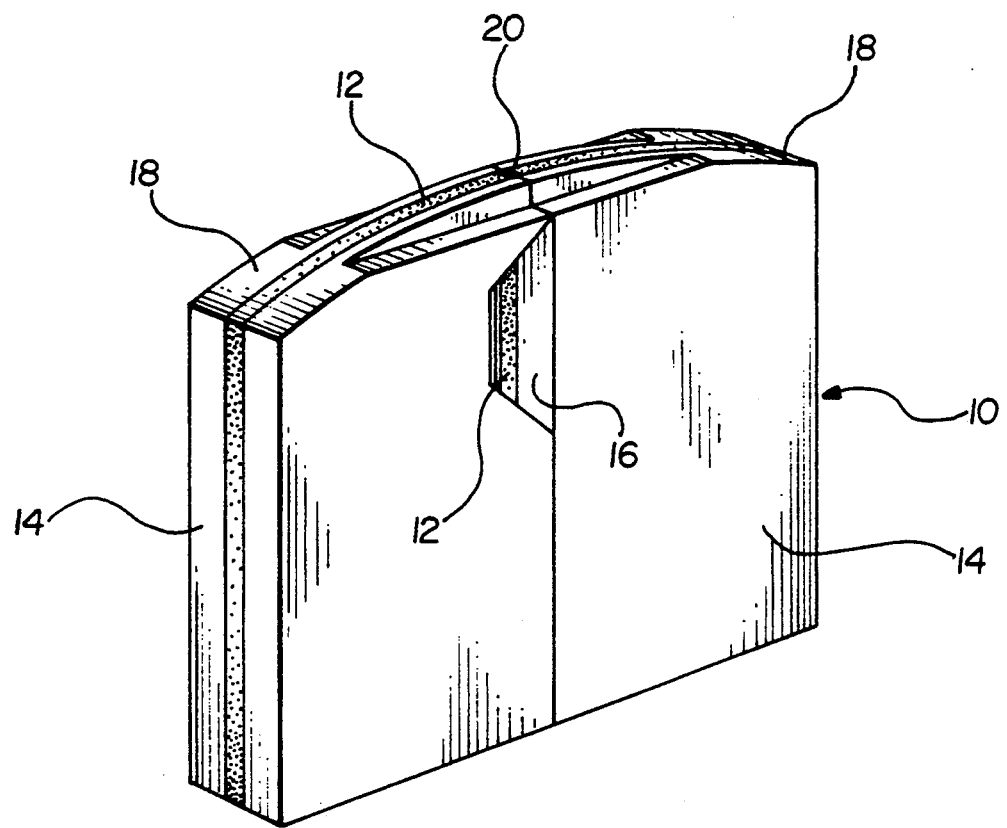
FIG. 1 is a perspective view of a magnetic head in accordance with the invention.

FIG. 1 shows generally the geometry (not to scale) of a magnetic head 10 in accordance with the present invention. The head 10 is of composite construction including a relatively thin multilayered core 12, comprised of alternating layers of magnetic and insulator materials, sandwiched between two ceramic substrates 14. Each substrate 14 and the core 12 cooperatively form a window 16 through which a coil (not shown) can be wound, and a curved media-contact surface 18 on opposite sides of a centrally located gap 20 of the core.

An object of the invention is to provide a magnetic head capable of recording on high-coercivity media, for example media having a coercivity of at least 1500 Oe. For that purpose, an important head material parameter is saturation magnetization. An FeRuGaSi alloy film, whose typical composition is $Fe_{72}Ru_4Ga_7Si_{17}$ and $Fe_{68}RuSGa_7Si_{17}$ (atomic percent), is known in the art to have excellent soft magnetic properties with high saturation magnetic induction, suitable for magnetic recording/playback in a high frequency range near 100 MHz. See, for example, Journal of Applied Physics, Vol. 64., No. 2, Jul. 15, 1988, pgs. 772–779 entitled Soft Magnetic properties of FeRuGaSi alloy films: SOFMAX ® by K. Hayashi et al.

Figure 2:
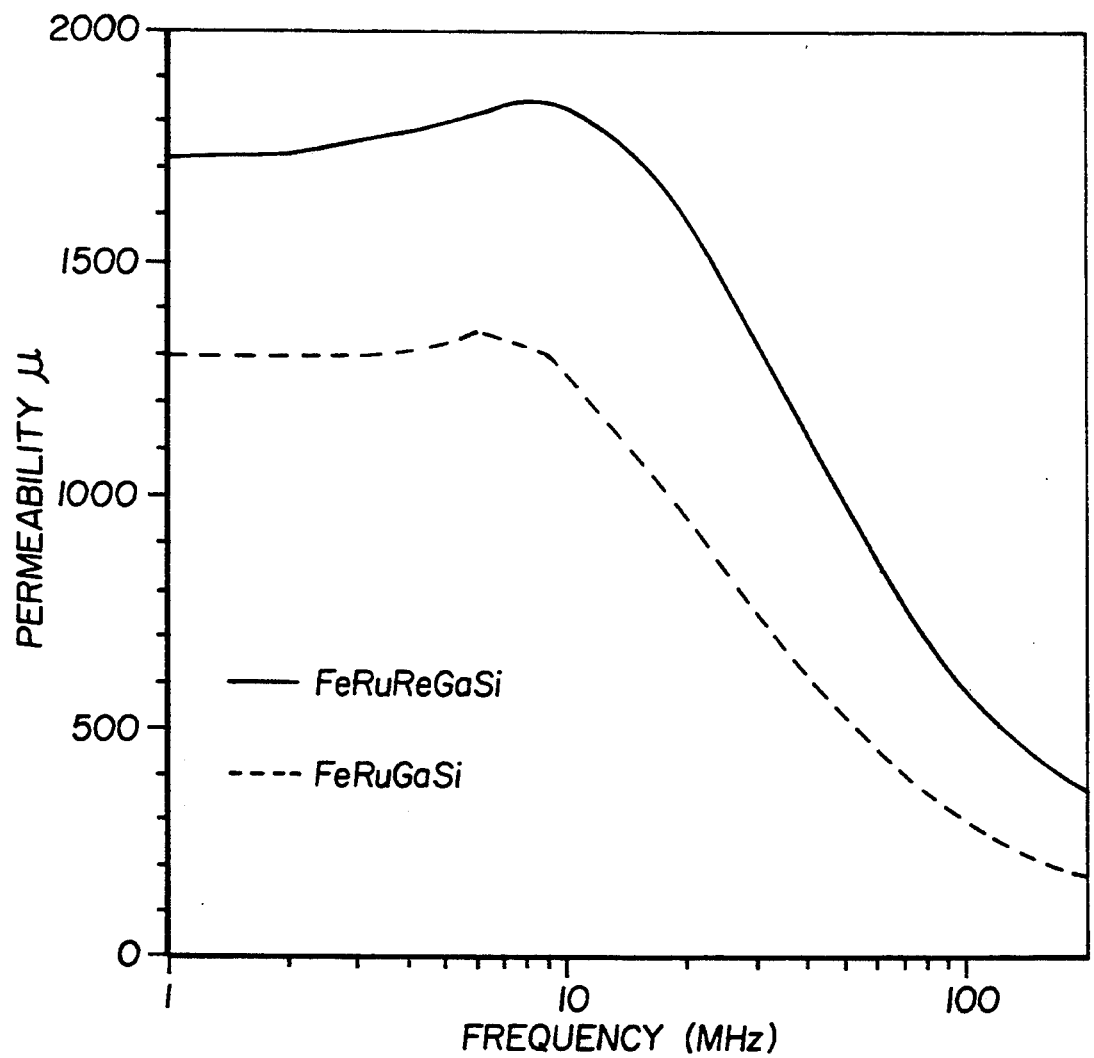
FIG. 2 illustrates the permeability of FeRuGaSiRe and FeRuGaSi as a function of frequency.

We have found, however, that by adding either zirconium (Zr), rhenium (Re), cobalt (Co), or nickel (Ni) to an FeRuGaSi film, the permeability of the resultant additive alloy film, i.e., FeRuGaSiX where X is selected from the group Zr, Re, Ni, and Co, is greater than the permeability of FeRuGaSi at frequencies in excess of 100 MHz. Adding an element like Re to an FeRuGaSi base alloy results in an additive alloy that has a high-frequency permeability that is greater than permeability of the base alloy. FIG. 2 compares the respective permeabilities of FeRuGaSiRe and FeRuGaSi as a function of frequency. We have further found that the addition of either Zr, Re, Ni, or Co to FeRuGaSi reduces anisotropy dispersion (the so-called ripple effect), and causes the additive alloy to have softer magnetic properties without significant change in its high saturation magnetization.

Accordingly, we have chosen FeRuGaSiX as the basic magnetic material for the core where X is selected from the group Zr, Re, Ni, and Co. More specifically, for a presently preferred embodiment we use FeRuGaSiX with composition 65–75 atomic percent (at %) Fe, 8–10 at % Ru, 6–7 at % Ga, 8–15 at % Si, and at % less than 10 of X.

Figure 3:
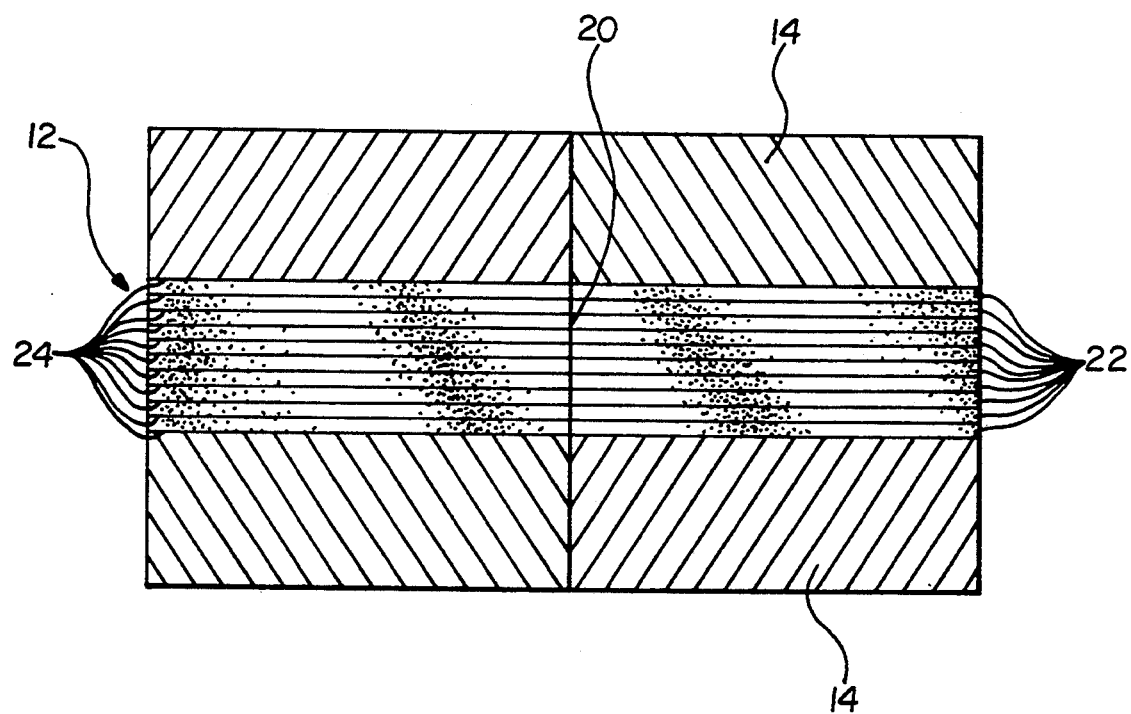
FIG. 3 is a plan view of a media-contact surface of the magnetic head of FIG. 1.

A further object of the invention is to provide adequate frequency response up to at least 150 MHz. Because of the need for high permeability at high frequency, it is important to minimize eddy current effect. Therefore, the core 12 has a laminated structure comprised of alternating layers of magnetic and insulator materials. More specifically, the core 12 is a multilayered structure (FIG. 3) comprised of thin layers of FeRuGaSiX uniaxial anisotropic magnetic film 22 alternating with even thinner layers of a dielectric material 24 such as $SiO_2$ or $Al_2O_3$. The alternating layers of magnetic and dielectric films function to reduce eddy current loss effects at high frequencies. In a high-frequency application, an important head parameter is resistivity. FeRuGaSiRe has a resistivity of 130 ohm-cm, which is similar to the resistivity of an FeRuGaSi alloy film. In the presently preferred embodiment, each layer of magnetic material is chosen to be approximately 2-μm thick. At a frequency of 150 MHz, skin depth is calculated to be 1.0 μm, one-half the thickness of each magnetic layer.

Each dielectric film has a thickness of approximately 100 nanometers (nm), to prevent electrical coupling between the magnetic layers at 150 MHz. With each layer of a 2 μm magnetic film, the critical dielectric thickness for $Al_2O_3$ is calculated to be 22 nm at 150 MHz. Accordingly, a 100-nm dielectric film is more than adequate to prevent coupling between the magnetic layers at 150 MHz.

We selected MnNi oxide as the ceramic substrate material because of its excellent wear-resistant property. Furthermore, MnNi oxide, FeRuGaSiX, and $Al_2O_3$ have respective thermal expansion coefficients that are well matched over a temperature range of 20° C. to 800° C.

In the manufacture of a magnetic head 10, each FeRuGaSiX film was sputter-deposited from a vacuum cast target using a DC triode gun with magnetic field enhancement. Each dielectric film, on the other hand, was deposited from an appropriate dielectric target using an RF diode gun. Actual deposition of the magnetic and dielectric films occurred in a sputter chamber, evacuated to the pressure of $2 \times 10$ torr. Sputtering was performed using a high-purity Argon gas at three (3) millitorr pressure. The deposition rate was 1 μm/hour for FeRuGaSiX. A 200 Oe magnetic field was applied during the deposition process in order to form a magnetic film having uniaxial anisotropy.

The annealing process strongly influences permeability and the coercivity (magnetic softness) of sputtered magnetic film. For our application, the thin films deposited for head fabrication were annealed at 450° C. for 10 minutes.

Figure 4A:
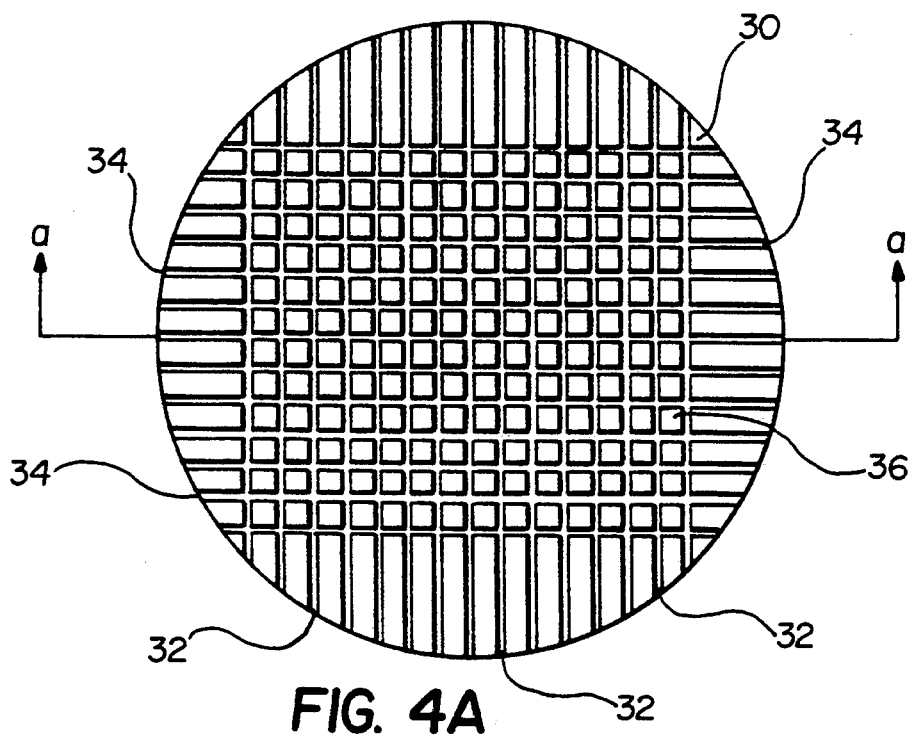
FIGS. 4(a) through 4(f) illustrate various manufacturing steps in the assembly of the magnetic head of FIG. 1.

FIGS. 4(a) through 4(f) illustrate generally the fabrication and assembly process for a magnetic head 10. The plan view of FIG. 4(a) shows a MnNi oxide wafer 30 having orthogonal shallow grooves 32, 34 cut therefrom. The grooves serve as lanes for subsequently dicing the wafer 30 into quarter-pole sections 36.

Figure 4B:
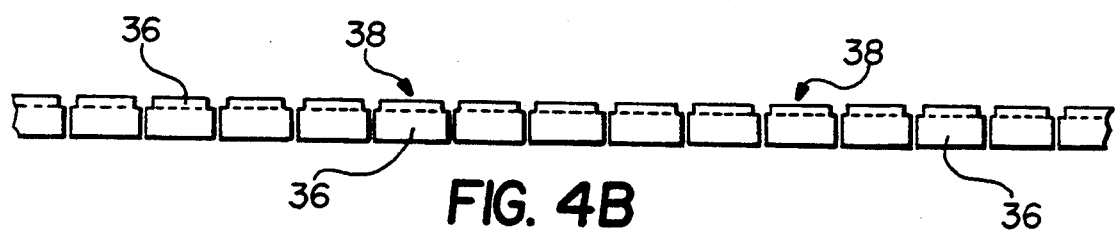

FIG. 4(b), which is an enlarged cross-sectional view of the wafer 30 along the lines a—a of FIG. 4(a), shows that the wafer 30 is first broken along the grooves 32 into columnar sections 38.

Figure 4C:
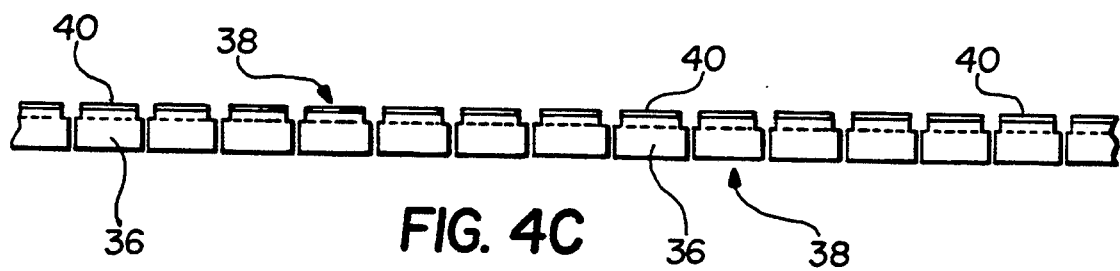

FIG. 4(c) shows that each columnar section 38 is then top-surface coated with a multilayer structure 40 comprising alternating layers of the magnetic material FeRuGaSiX and the appropriate dielectric. Each magnetic layer and each dielectric layer are sputter deposited, as described previously, to a thickness of 2 μm and 100 nm, respectively. Each structure 40 includes a total of five (5) layers of magnetic material, to form essentially a 10-μ thick multilayer which serves as one-half the width of the core 12 of the magnetic head 10.

Figure 4D:
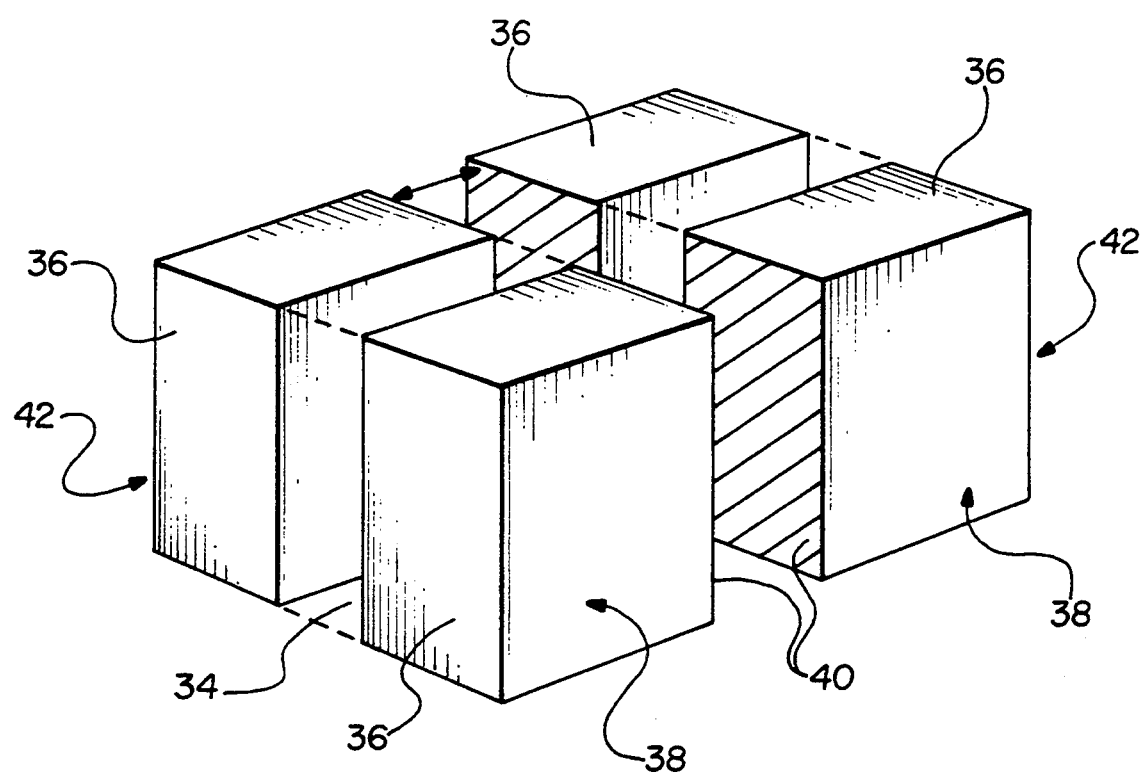

FIG. 4(d) is an enlarged perspective view showing two quarter-pole sections 36 for each of two columnar sections 38 aligned with their respective multilayered core structures 40 facing each other. The corresponding core structure 40 are first epoxy bonded to each other, then the columnar sections 38 are broken apart along corresponding grooves 34 to form identical half-pole sections 42 having a total core width of approximately 20 μm.

Figure 4E:
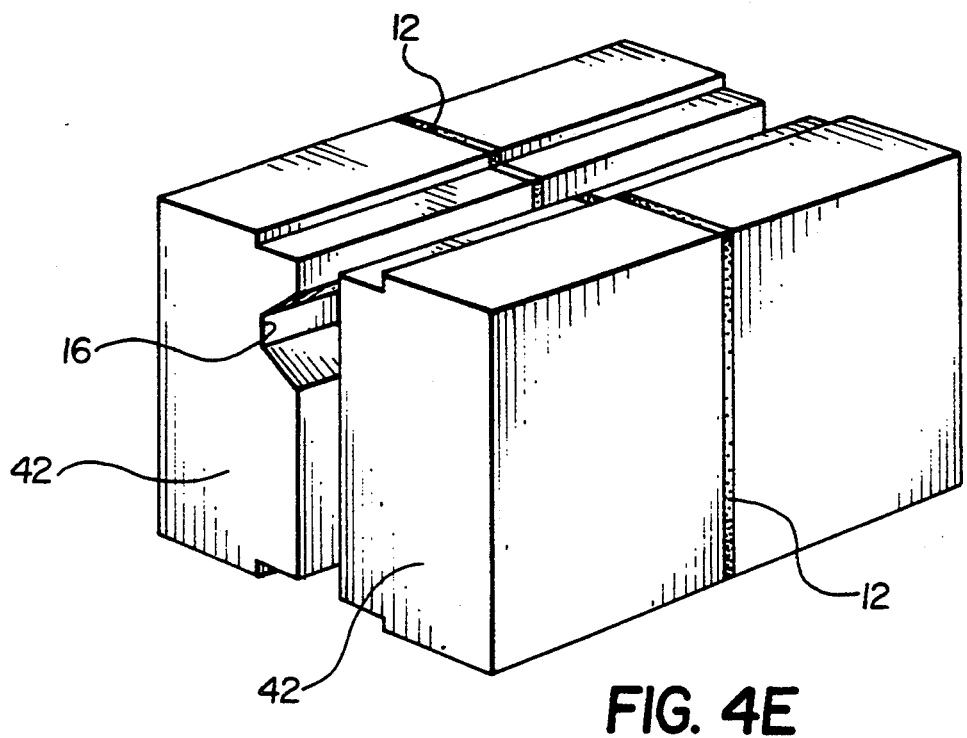

FIG. 4(e) illustrates that one of each corresponding pair of half-pole sections 42 is then cut to form the aforementioned window 16. Corresponding faces of each half-pole sections 42 are then polished perpendicular to the sandwiched core 12, to create a smooth gap interface onto which a gap spacer is sputtered. Each pair of half-pole section 42 is then core aligned and a second epoxy bonding is performed, thereby forming the aforementioned gap 20 (FIG. 1) at the interface between the two half-pole sections.

Figure 4F:
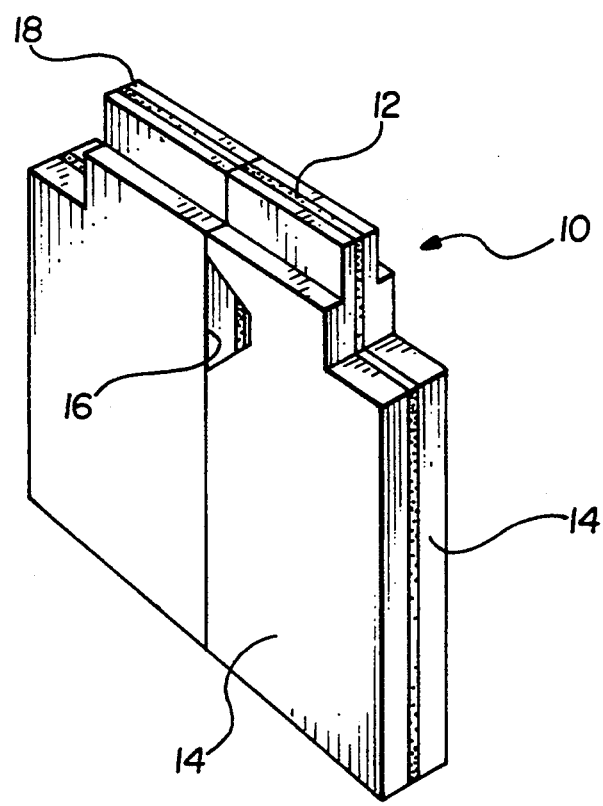

FIG. 4(f) shows that the bonded structure is then ground to a final thickness and desired configuration (a 2 μm by 2 mm outer dimension for its major surface) and the media—contact surface 18 is lapped to a final gap depth.

The overall geometry of the magnetic head 10 is chosen to minimize inductance and maximize efficiency. To those ends, the perimeter of the window 16 (FIG. 1) is an important factor. For a fixed permeability, a small perimeter increases efficiency and lowers inductance. The window 16 is selected to hold six (6) turns of 52-gage wire, the total perimeter being 0.7 mm.

Head efficiency varies inversely with gap depth, whereas head life is proportional to gap depth. Due to these somewhat conflicting requirements, a gap depth of 25 μm was chosen, which provides an estimated head life of 2500 hours.

A micro gap is preferred for short-wavelength recording. It is known in the art, however, that peak efficiency in playback occurs with a gap length of one-half the shortest recorded wavelength. The gap length for our application was chosen to be 0.25 μm.

The invention has been described in detail with reference to the figures; however, it will be appreciated that variations and modifications are possible within the spirit and scope of the invention.

What is claimed is:

1. A magnetic head for reading and writing signals to at least a frequency of 150 Mhz having a media-contact surface defined by a gapped magnetic core sandwiched between a pair of ceramic substrates, said magnetic core being a multilayered structure comprising: a multiplicity of thin layers of FeRuGaSiX magnetic material alternating with even thinner layers of a dielectric material, each of said magnetic layers having uniaxial anisotropy, said layers being of substantially equal thickness and having said uniaxial anisotropy aligned in the same direction in each of said layers, and said layers further of a thickness less than 3 µm and having X selected from the group consisting of Zr, Re, Ni and Co of an atomic weight percentage of less than 10%.

2. A magnetic head as defined in claim 1 or claim 5 wherein said dielectric material is selected from the group consisting of aluminum oxide and silicon dioxide.

3. A magnetic head as defined in claim 2 wherein each layer of dielectric material is no greater than approximately 100 nm thick.

4. A magnetic head as defined in claim 1 that is productive of a flux density of a magnitude that is capable of saturating a magnetic recording medium of at least 1500 oersteds.

5. A magnetic head for reading and writing signals to at least a frequency of 150 Mhz having a media-contact surface defined by a gapped magnetic core sandwiched between a pair of ceramic substrates, said magnetic core being a multilayered structure comprising: a multiplicity of thin layers of FeRuGaSiX magnetic material alternating with even thinner layers of a dielectric material, each of said magnetic layers having uniaxial anisotropy, said layers being of substantially equal thickness and having said uniaxial anisotropy aligned in the same direction in each of said layers, and said layers further of a thickness less than 2 µm and having X selected from the group consisting of Zr, Re, Ni and Co of an atomic weight percentage of less than 10%.

* * * * *